(12) United States Patent
Noble et al.

(10) Patent No.: US 7,533,037 B1
(45) Date of Patent: May 12, 2009

(54) METHODS AND SYSTEMS FOR FORECASTING DAILY PRODUCT SALES

(75) Inventors: Mardie S. Noble, Minesing (CA); Ejaz Haider, Markham (CA); Shireengul Islam, Markham (CA)

(73) Assignee: Teradata US, Inc., Miamisburg, OH (US)

( * ) Notice: Subject to any disclaimer, the term of this patent is extended or adjusted under 35 U.S.C. 154(b) by 1257 days.

(21) Appl. No.: 10/703,011

(22) Filed: Nov. 6, 2003

(51) Int. Cl.
*G06F 17/30* (2006.01)
(52) U.S. Cl. ...................................................... 705/10
(58) Field of Classification Search .................... 705/10
See application file for complete search history.

(56) References Cited

U.S. PATENT DOCUMENTS 6,151,582 A * 11/2000 Huang et al. .................... 705/8
7,155,402 B1 * 12/2006 Dvorak ........................ 705/10
7,340,410 B1 * 3/2008 Vaillancourt et al. .......... 705/10

OTHER PUBLICATIONS

Moon et al (Customer Demand Planning at Lucent Technologies: A Case Study in Continuous Improvement through Sales Forecast Auditing), Jan. 2000, Industrial Marketing Management, pp. 1-8.*
Fader et al (Forecasting Repeat Sales at CDNOW), Jun. 2001, Marketing-Buyer behavior, pp. 94-107.*
Luxhoj et al (A hybrid econometric-neural network modeling approach for sales forecasting), Dec. 1996, International Journal of Production economics, pp. 175-192.*

* cited by examiner

*Primary Examiner*—Romain Jeanty
(74) *Attorney, Agent, or Firm*—James Stovey, Attorney

(57) ABSTRACT

A method for forecasting daily sales patterns for retail products. The method uses historical daily demand data for a product to calculate a daily weight value for the product for each day of the week, each daily weight value representing the ratio of the historical daily demand for a corresponding day of the week to a total of the historical daily demands for the entire week. A daily demand forecast for each day of a forthcoming week is determined by applying the daily weight values to a predetermined weekly demand forecast for the forthcoming week. Store closure coefficients are applied to the daily demand forecasts for days immediately preceding and following store closures or holidays to adjust the daily forecasts to accommodate changes in customer buying patterns resulting from the store closures.

7 Claims, 16 Drawing Sheets

FIG. 2
| Week 1 | Week 2 | Week 3 |
|---|---|---|
| R R | R R R R R R | R R |
FIG. 3
| 2 Days before store closure | 1 Day before store closure | Store closure | 1 Day after store closure |
|---|---|---|---|
| 20% | 50% | 0 | 30% |
FIG. 4
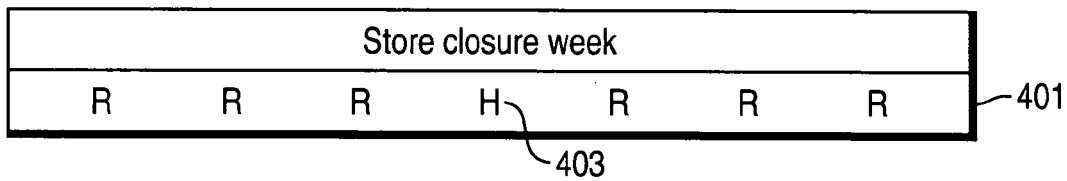
FIG. 5
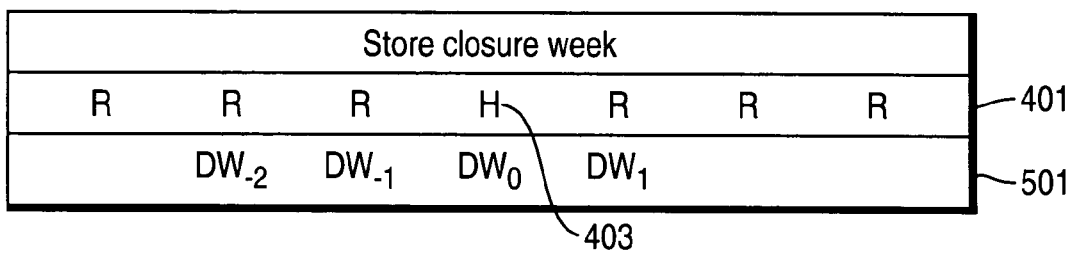
FIG. 6
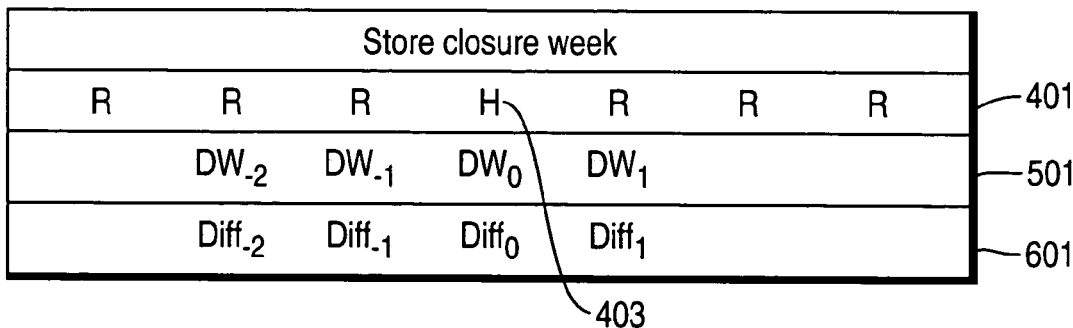

| FIG. 10A |
| FIG. 10B |
| FIG. 10C |

FIG. 11
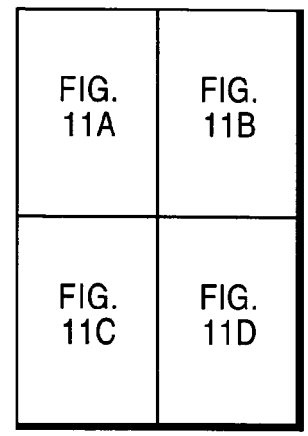
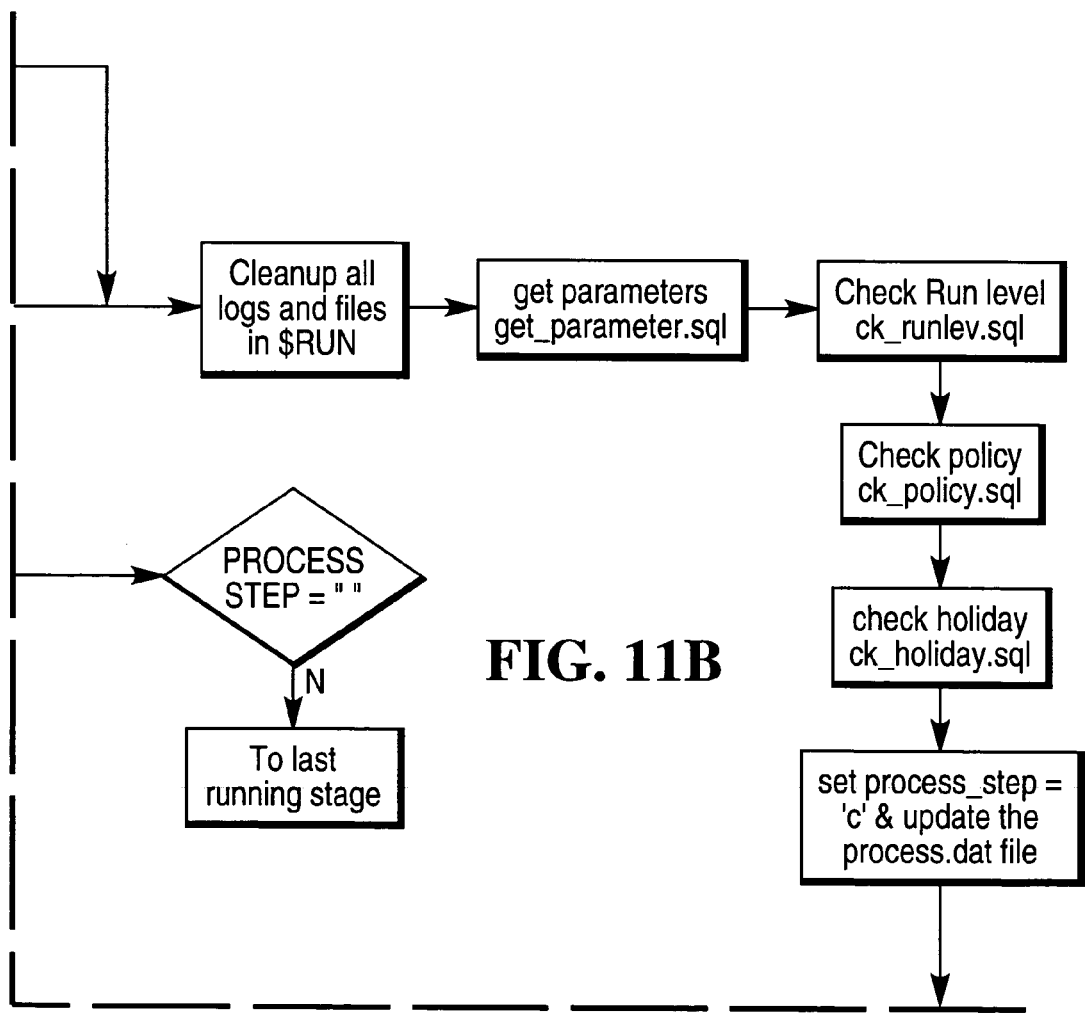
FIG. 11B

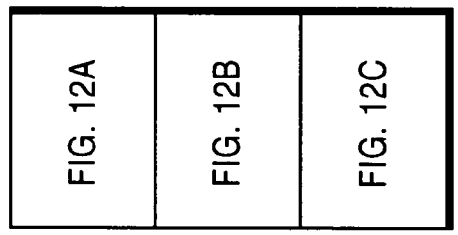
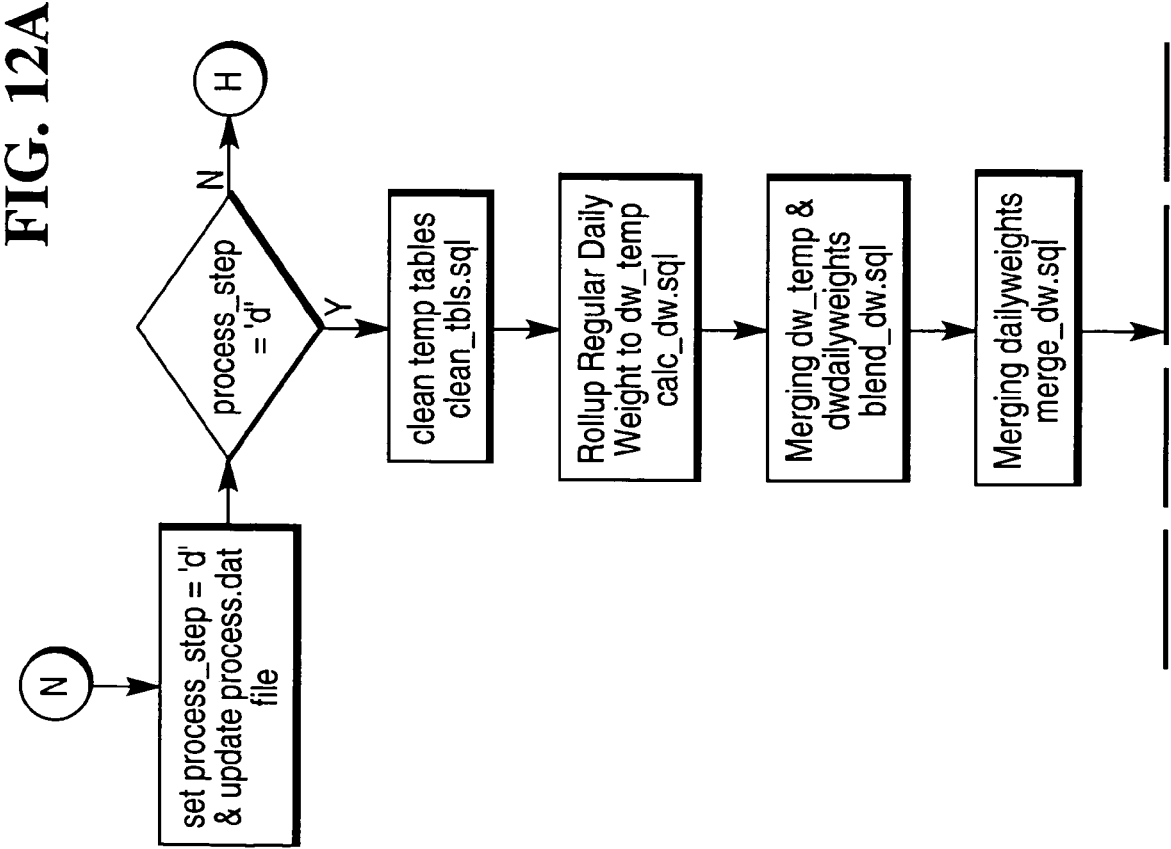

METHODS AND SYSTEMS FOR FORECASTING DAILY PRODUCT SALES

CROSS REFERENCE TO RELATED APPLICATIONS

This application is related to the following co-pending and commonly-assigned patent application, which is incorporated by reference herein:

Application Ser. No. 10/702,963, entitled "METHODS AND SYSTEMS FOR DETERMINING DAILY WEIGHTING FACTORS FOR USE IN FORECASTING DAILY PRODUCT SALES," by Mardie Noble, Pat McDaid and Jean-Philippe Vorsanger; filed on the same day herewith.

FIELD OF THE INVENTION

The present invention relates to methods and systems for forecasting product demand for retail operations, and in particular to the determination of daily sales patterns for products and the use of daily sales patterns in forecasting product sales and implementing product promotions.

BACKGROUND OF THE INVENTION

Accurately determining demand forecasts for products are paramount concerns for retail organizations. Demand forecasts are used for inventory control, purchase planning, work force planning, and other planning needs of organizations. Inaccurate demand forecasts can result in shortages of inventory that are needed to meet current demand, which can result in lost sales and revenues for the organizations. Conversely, inventory that exceeds a current demand can adversely impact the profits of an organization. Excessive inventory of perishable goods may lead to a loss for those goods.

Inferior forecasting science and gut feel decisions on inventory have created significant stock-out conditions across the industry. Recent studies quantify stock-outs in the retail industry at 5 to 8%, while overstock conditions caused by poor forecasts and buys continue to climb.

This challenge makes accurate consumer demand forecasting and automated replenishment techniques more necessary than ever. A highly accurate forecast not only removes the guess work for the real potential of both products and stores/distribution centers, but delivers improved customer satisfaction, increased sales, improved inventory turns and significant return on investment.

Teradata, a division of NCR Corporation, has developed a suite of analytical applications for the retail business, referred to as Teradata Demand Chain Management, that provides retailers with the tools they need for product demand forecasting, planning and replenishment. As illustrated in FIG. 1, the Teradata Demand Chain Management analytical application suite 101 is shown to be part of a data warehouse solution for the retail industries built upon NCR Corporation's Teradata Data Warehouse 103, using a Teradata Retail Logical Data Model (RLDM) 105. The key modules contained within the Teradata Demand Chain Management application suite 103, organized into forecasting and planning applications 107 and replenishment applications 109, are:

Demand Forecasting: The Demand Forecasting module 111 provides store/SKU (Stock Keeping Unit) level forecasting that responds to unique local customer demand. It continually compares historical and current demand and utilizes several methods to determine the best product demand forecast.

Seasonal Profile The Seasonal Profile module 113 automatically calculates seasonal selling patterns at all levels of merchandise and location, using detailed historical sales data.

Contribution: Contribution module 117 provides an automatic categorization of SKUs, merchandise categories and locations by contribution codes. These codes are used by the replenishment system to ensure the service levels, replenishment rules and space allocation are constantly favoring those items preferred by the customer.

Promotions Management: The Promotions Management module 119 automatically calculates the precise additional stock needed to meet demand resulting from promotional activity.

Automated Replenishment: Automated Replenishment module 121 provides suggested order quantities based on business policies, service levels, forecast error, risk stock, review times, and lead times.

Allocation: The Allocation module 123 determines distribution of products from the warehouse to the store.

The Teradata Demand Chain Management solution described above provides a retailer with improved customer service levels and reductions in unproductive inventory, and is particularly adept at assisting a retailer forecast and plan for seasonal sales cycles. However, for many retailers the sales pattern of different products varies from day to day. Some products sell the same throughout a week while the sale of some products follows a certain pattern that, for example, might have higher sales over the weekend as compared to during the weekend. Holidays also affect the sales pattern for certain products. Before a long holiday, sales may be higher for some products, e.g., perishable goods, milk, soft drinks and other highly consumable items, because stores may be closed or shopping inconvenient for consumers. Most retailers and particularly Food and Grocery retailers need to accurately forecast daily sales in order to minimize store inventories and optimize store replenishment schedules.

Therefore, there exists a need for improved demand chain forecasting tools that provide retailers with an accurate picture of product sales patterns over a week. Additionally, such forecasting tools may assist a retailer in forecasting product sales during holiday periods or store closures, and in implementing sales for promotions that are shorter than a week in duration.

SUMMARY OF THE INVENTION

It is an object of the present invention to provide a new and useful system and method for forecasting daily product sales for a retailer.

It is a further object of the present invention to provide such a system and method for forecasting product sales during holiday periods or weeks including store closures.

The method for forecasting daily product sales includes the steps of acquiring historical daily demand data for a product for a period of at least one regular week; calculating a daily weight value for the product for each day of the regular week, wherein each daily weight value represents the ratio of the historical daily demand for a corresponding day of the regular week to a total of the historical daily demands for the entire week; and determining a daily demand forecast for each day of a forthcoming week from the daily weight values and a predetermined weekly demand forecast for the forthcoming week.

The method described herein further includes the steps of acquiring historical daily demand data for the product for a period of at least one week that includes a store closure day; calculating a store closure coefficient for the product for each store closure impacted day of the week that includes the store closure day, wherein each store closure coefficient represents the ratio of the historical daily demand for a corresponding store closure impacted day to the historical demand for a corresponding day during the regular week; and modifying the daily demand forecast for each day of a forthcoming week including a store closure day through application of the store closure coefficients to the prior determined daily demand forecasts. In the described embodiment, store closure impacted days comprise the two weekdays prior to the store closure day and the one weekday following the store closure day.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

BRIEF DESCRIPTION OF THE DRAWINGS

FIG. 2 provides an illustration of a regular store week for calculation of daily weights to be used in daily sales forecasting.

FIG. 3 is a table listing an exemplary set of default uplift values utilized to adjust daily weights during a store closure week.

FIGS. 4 through 7 illustrate a process for calculating store closure coefficients for modifying daily sales forecasts during weeks including holidays or other store closures.

FIGS. 11A through 11D and 12A through 12C provide a process flow diagram for a system for calculating daily weights and forecasts.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

Figure 1:
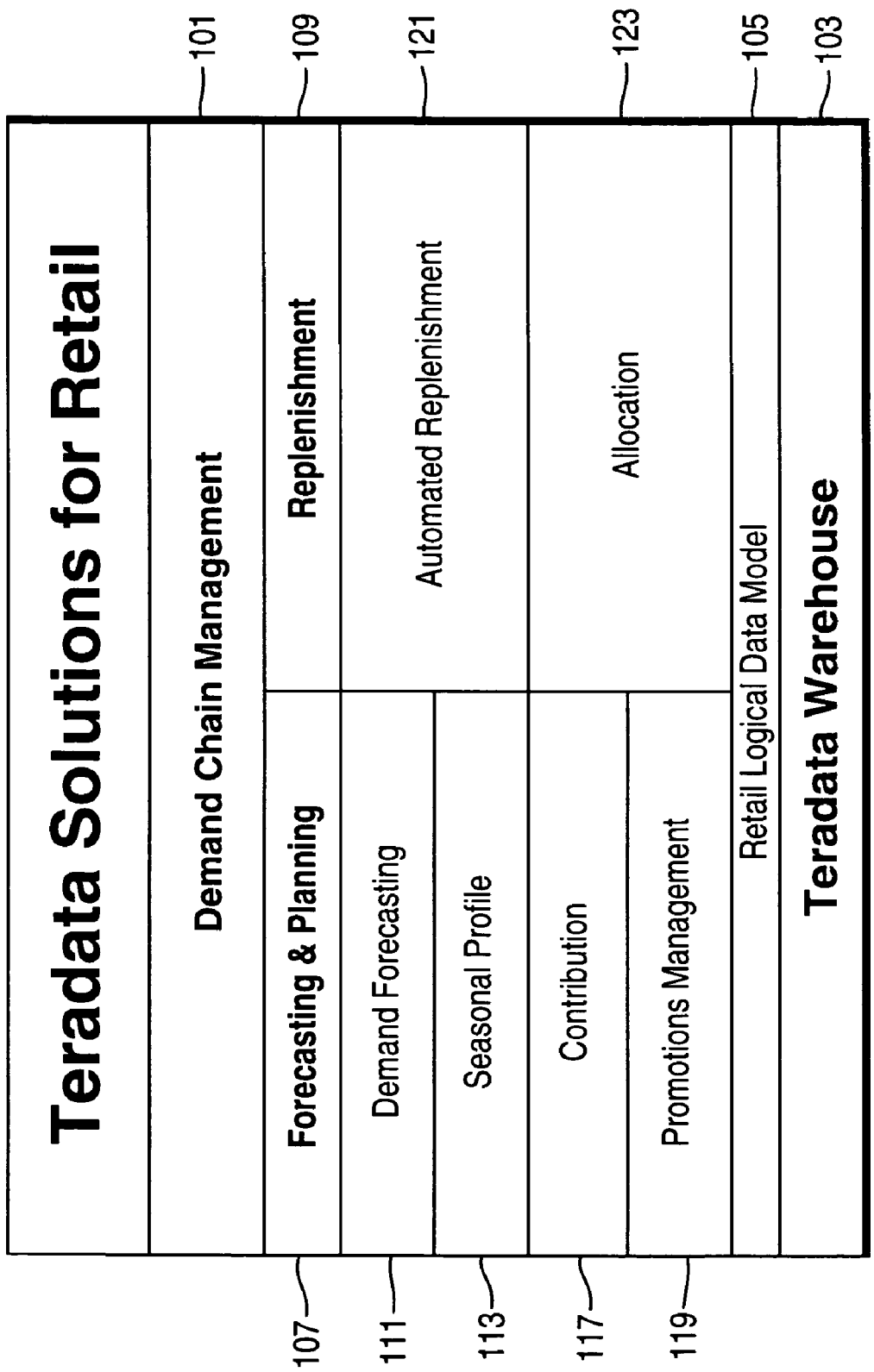
FIG. 1 provides an illustration of a forecasting, planning and replenishment software application suite for the retail industries built upon NCR Corporation's Teradata Data Warehouse.

The Teradata Demand Chain Management solution described above and illustrated in FIG. 1 provides a retailer with improved customer service levels and reductions in unproductive inventory, and is particularly adept at assisting a retailer forecast and plan for seasonal sales cycles. The improved demand chain forecasting tool described herein provides retailers with an accurate picture of product sales patterns over a week, determines the effect of holidays and store closures on these weekly product sales patterns, and integrates these results with seasonal sales patterns and historical demand to accurately forecast daily sales.

The sales patterns of different products vary from day to day. Some products sell the same throughout a week whereas other products follow a certain pattern and might have higher sales over the weekend as compared to weekday sales. Holidays and store closures both affect weekly sales pattern. A holiday may affect regular weekly sales patterns depending on the day of the week the holiday will be since consumers may decide to anticipate purchases or may need to purchase certain items to realize their holiday plans. In addition, store closures, whether on a holiday or not will also affect weekly patterns since some of the sales that would have been realized on that day will be occur in the few previous or following days.

The weekday sales forecasting tool described below utilizes daily weights calculated from historical weekly sales data for normal weeks wherein regular operating hours are maintained, and sales data from weeks including holiday or other store closures, to forecast future weekly sales and implement product promotions.

Determination of Daily Weights—Regular Week Calculations

Daily weights, or the percentage each day of the week contributes to the weekly sales for a product, calculated for each day of the week are used in forecast calculations for non-promotional and promotional sales that are shorter than a week and in any other forecast calculation where the forecast is established for less than one week.

A Regular Week, defined as a week without holidays or store closures, is illustrated in the table of FIG. 2. Three weeks, labeled Week 1, Week 2 and Week 3, are illustrated in FIG. 2. Within each week, the letter "R" is used to represents a regular business day. Week 2, including seven regular business days each represented with an "R", preceded by two regular business days at the end of Week 1, and followed by two regular business days at the beginning of Week 3, is considered a Regular Week. The seven days comprising Week 2, may be Sunday through Saturday, Monday through Sunday, or any seven consecutive days of interest to a retailer.

In the implementation described herein, the data for a week can only be used for daily weight calculation if that week has no store closures and there are no store closures in the two days before the beginning and two days after the end of the week in consideration.

Daily weights are determined for a product through employment of the following formula:

$$W_{day1} = \frac{Dmnd_{day1} * 100}{\sum_{n=1}^{7} Dmnd_{dayn}}$$

wherein $W_{day1}$ is the weight calculated for day 1 of a regular week, $Dmnd_{day1}$ is the demand for the product on day 1, and $Dmnd_{dayn}$ is the demand for the product on day n. Weights are calculated for each of the seven days of the regular week, day 1 through day 7.

Previous daily weights and current week daily weights are combined using a global system defined adaptive factor to determine the new daily weight for daily forecast calculation.

The global adaptive factor represents the percentage of previous daily weights and current daily weights to be used for new daily weight calculations. Previous daily weights and current week daily weights are combined in accordance with the following equation:

$$W = (1-A)*W_{n-1} + A*W_n$$

Wherein $W_{n-1}$ is the previously calculated daily weight, $W_n$ is the currently calculated daily weight from last week's demand, A is the adaptive factor, and W is the new daily weight. A suggested value for adaptive factor A is 20%, thus the new daily weight is determined by combining 80% of the previous daily weight with 20% of the current week daily weight.

Determination of Daily Weights—Weekly Pattern Calculations with Store Closures

A Store Closure Week is defined as a week that includes a store closure during that week or in the period two days before the beginning or one day after the end of the week in consideration.

In the implementation described herein, the data for a week can only be used for daily weight calculation if that week has no store closures and there are no store closures in the two days before the beginning and two days after the end of the week in consideration. Store closure coefficients are calculated and applied to the two days prior to, and one day following a store closure as shown in FIGS. 4 through 7 and described below. In the absence of calculated store closure coefficients, default uplifts may be applied to estimate demand for the days preceding and following a store closure. The table of FIG. 3 shows one possible set of default uplift values of 20% the day two days before a store closure, 50% for the day immediately prior to the store closure, and 30% for the day following the store closure. Of course, a retailer may elect different values for default uplifts that they believe are more appropriate for their business.

One process for calculating store closure coefficients for store closure weeks is described below with reference to FIGS. 4 through 7. The first step in calculating store closure coefficients is to organize the store closure week so that the holiday or store closure is placed in the middle of the week, as illustrated in row 401 of FIG. 4. The holiday or store closure day is represented by the letter "H", while the letter "R" indicates a regular business day. The store closure day 403 is shown to be the fourth day of the store closure week, regardless of the actual day of the week, i.e., Sunday, Monday, etc., the store closure occurs.

Daily weights are calculated for the two days prior and one day following the store closure using the formula for daily weight calculation given earlier, as illustrated in row 501 of FIG. 5, wherein $DW_{-2}$ represents the daily weight for the day two days prior to the store closure, $DW_{-1}$ represents the day immediately prior to the store closure, $DW_0$ is the daily weight for the store closure day, and $DW_1$ is the daily weight for the day following the store closure. Of course, the daily weight for a full day closure, $DW_0$, will be zero.

The difference in daily weights between corresponding days in the store closure week and a regular week are determined for the two days prior and one day following the store closure. The difference in daily weights for any one of the store closure impacted days is the daily weight for that day during a store closure week less the daily weight for a corresponding day during a regular week. The difference values, shown in row 601 of FIG. 6, are represented by the terms $Diff_{-2}$, $Diff_{-1}$, $Diff_0$ and $Diff_1$. $Diff_{-2}$, $Diff_{-1}$, $Diff_0$ and $Diff_1$ correspond to the day two days prior to store closing, the day one day prior to the store closing, the day of the store closure, and the day following the store closure, respectively.

Figure 7:
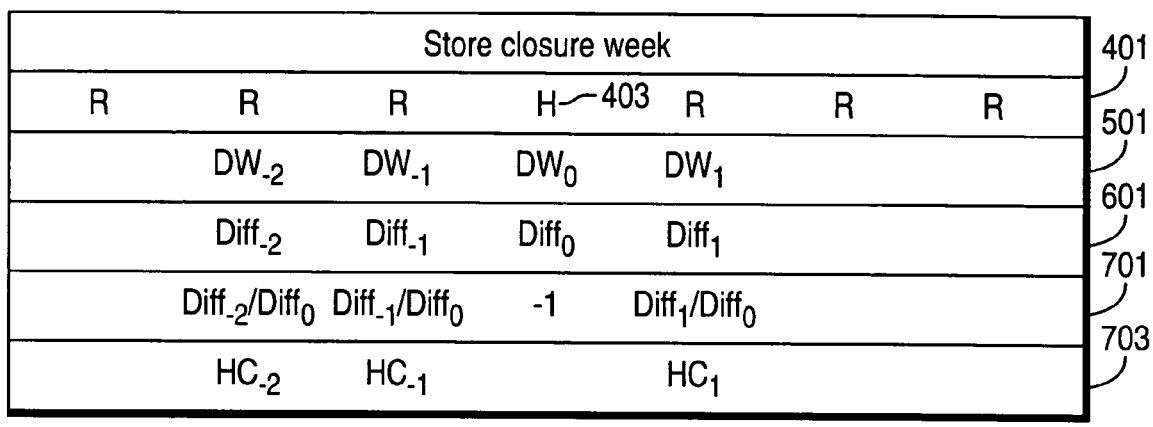

The difference values $Diff_{-2}$, $Diff_{-1}$, $Diff_0$ and $Diff_1$ are divided by the daily weights for the corresponding store closure impacted days, $DW_{-2}$, $DW_{-1}$, $DW_0$ and $DW_1$, as shown in row 701 of FIG. 7. The store closure coefficients, or holiday coefficients, identified in row 703 as $HC_{-2}$, $HC_{-1}$ and $HC_1$, are the values $Diff_{-2}/DW_{-2}$, $Diff_{-1}/DW_{-1}$ and $Diff_1/DW_{-2}$, respectively, expressed in percentage.

Store closure week daily weights are calculated for every week that includes a store closure. Previous store closure week daily weights and current store closure week daily weights are combined using the same adaptive factor as used in regular week daily weight blending, discussed above.

An example calculation for a store closure week with the following daily weights is provided below. The first row, labeled DW, of the table below contains the daily weights determined for the two days prior and one day following a recent store closure week. These values represent increased sales for the store closure effected days. The second row, labeled RW, contains the daily weights for a regular week. In this example, the daily weight for each day of the regular week is 0.17429, or 1/7 of weekly sales.

TABLE 1

Sample Holiday Coefficient Calculation

|  | −2 | −1 | 0 | +1 |
|---|---|---|---|---|
| DW | 0.171429 | 0.214286 | 0 | 0.185714 |
| RW | 0.142857 | 0.142857 | 0.142857 | 0.142857 |
| Diff | 0.028571 | 0.071429 | −0.14286 | 0.042857 |
| Diff/DW | 0.2 | 0.5 | −1 | 0.3 |
| HC | 20% | 50% |  | 30% |

The holiday coefficients determined for the example regular and store closure week daily weight values shown are: 20% for the day two days prior to the store closure, 50% for the day immediately before the store closure, and 30% for the day following the store closure. These coefficients are used in sales forecasting to adjust daily forecasts for store closure weeks, e.g., sales forecasts for a day following a store closure will be increased by 30% over a regular day forecast for that day.

Daily Forecasts

Figure 8:
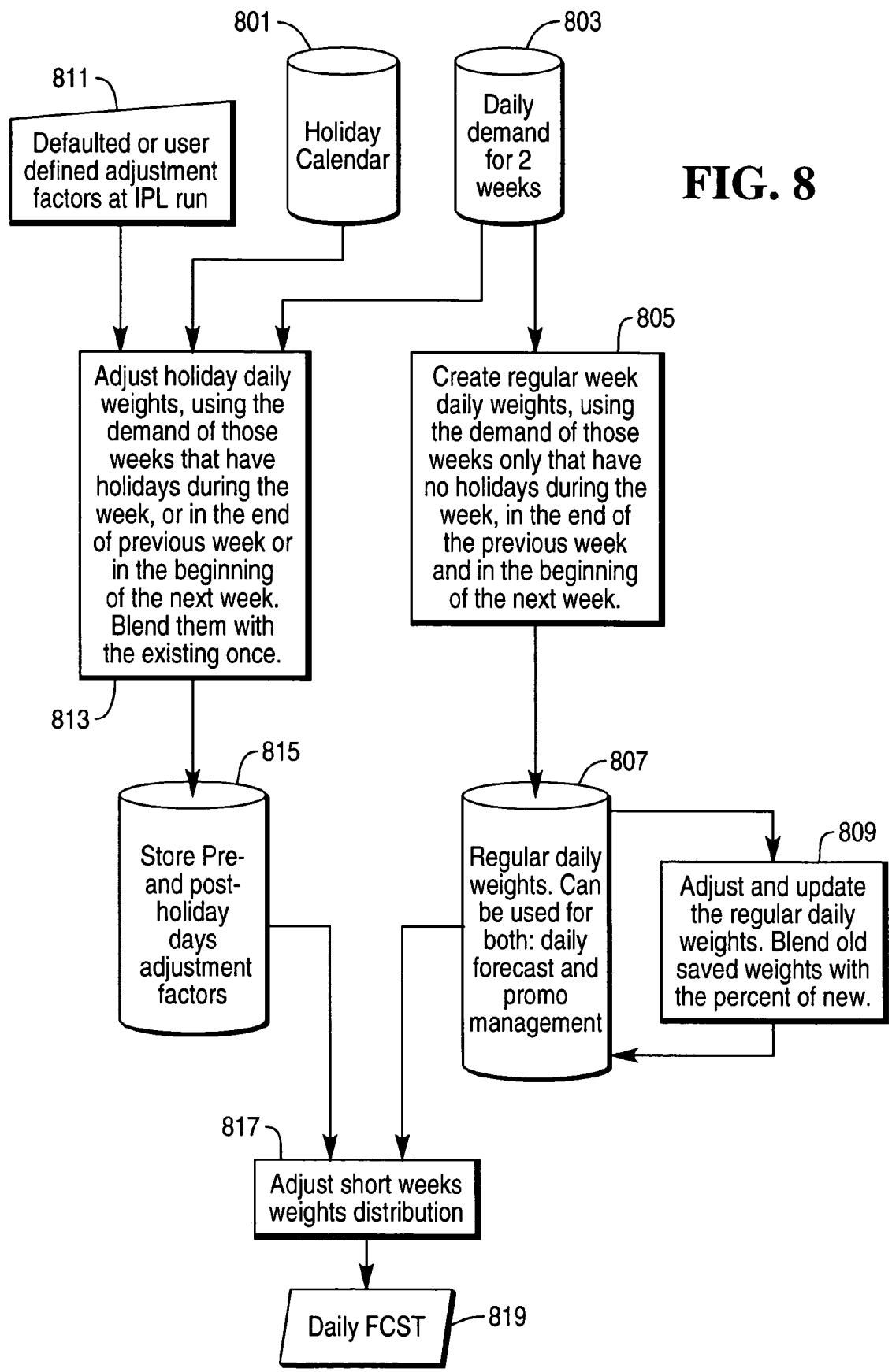
FIG. 8 is a flow diagram illustrating a process for determining daily forecasts for regular and store closure weeks.

A process for determining daily forecasts for regular and store closure weeks is illustrated in the flow diagram of FIG. 8. The process requires store closure information obtained from a holiday closure calendar containing a list of stores and dates specifying when the stores will be closed, as well as a minimum of two weeks daily demand, saved in data stores 801 and 803, respectively.

Regular week daily weights are determined in step 805. The daily weights are calculated from daily sales history for non-holiday weeks obtained from data store 803. Weeks with holidays are not used in the regular week daily weight calculations. If four weeks of daily sales history is available, the regular daily weights for any day of the week can be calculated by summing the four weeks of sales data for the weekday, and dividing this sum by the total sales for all days over the four weeks. For example: Sunday weight=Sum(sales on Sundays)/Sum(all sales for 4 weeks); and Saturday weight=Sum(sales on Saturdays)/Sum(all sales for 4 weeks).

Calculated daily weights are saved, 807, for use in daily forecast calculations and promotion management. As additional weekly sales data is accumulated, new weights are calculated and blended with the saved weights, the resultant replacing the previously saved values, as shown in step 809.

Similarly, holiday daily weights are determined as shown in step 813. Holiday, or store closure, adjustment factors, or coefficients, are calculated for pre and post store closure days and saved, 815. In the absence of store closure data or calculated holiday daily weights, default store closure adjustments 811 are provided during initial program load.

Regular week daily weights from data store 807 are combined with store closure coefficients from data store 815 in step 817 to generate daily forecasts 819.

Figure 9A:
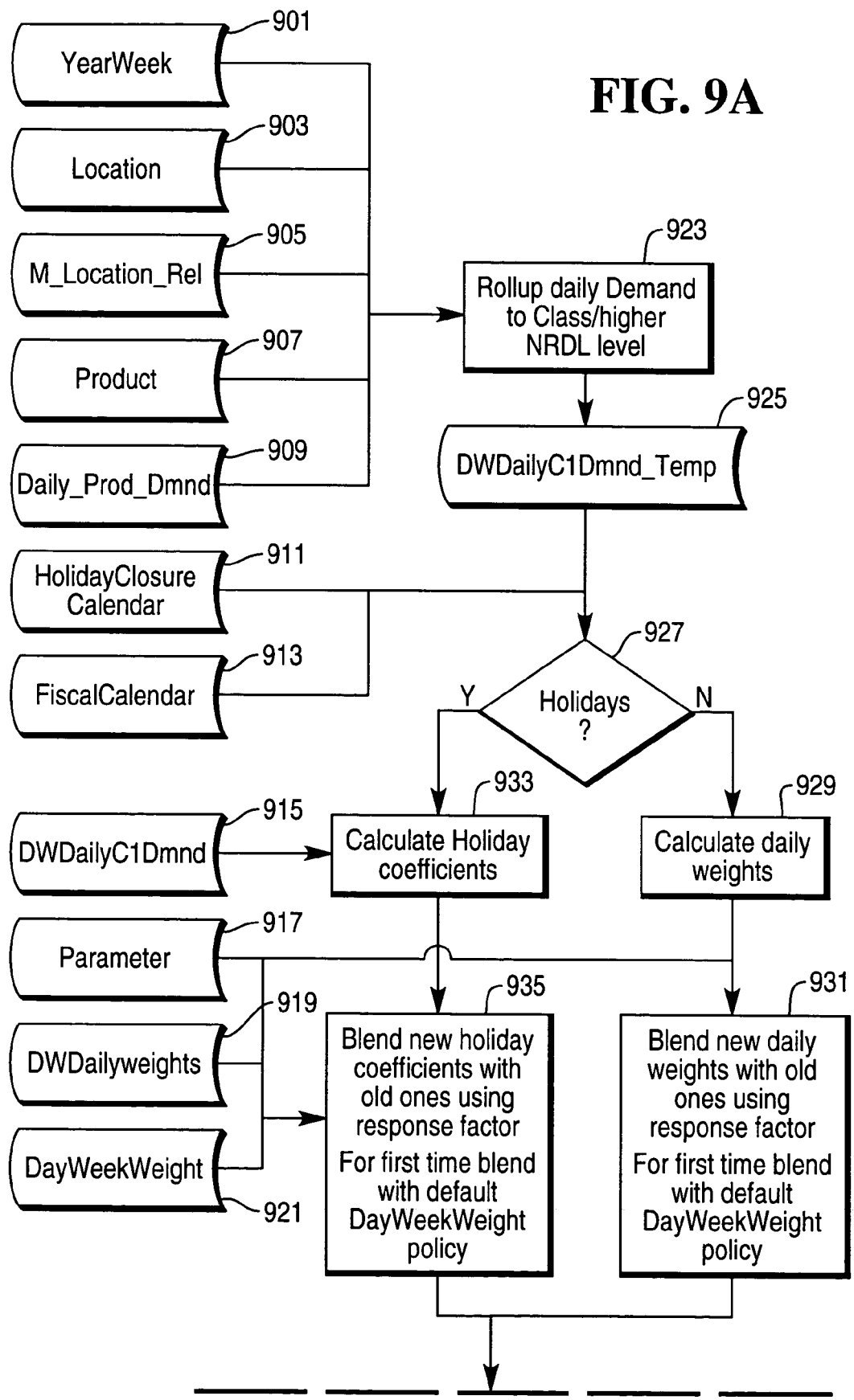
FIGS. 9A and 9B, taken together, provide a data flow diagram for a system for calculating daily weights and forecasts.
Figure 9B:
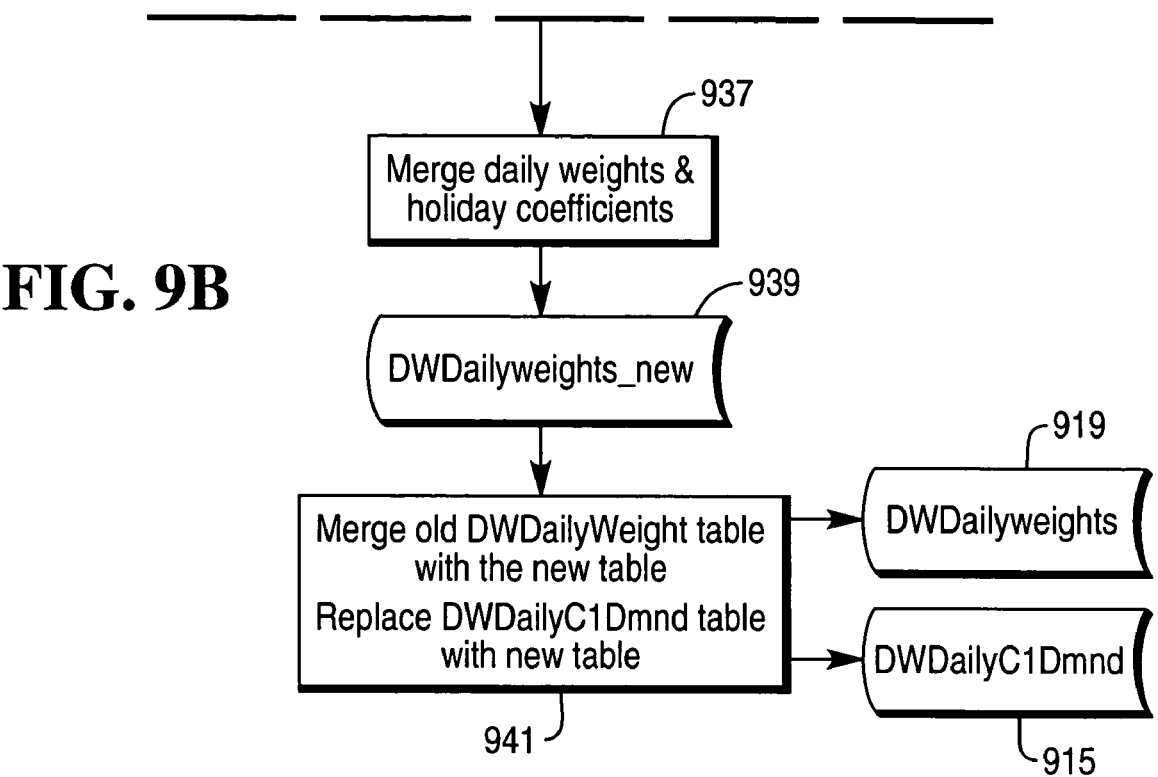

FIGS. 9A and 9B, taken together, provide a data flow diagram for a system for calculating daily weights. Data concerning product sales, retail store locations, holidays and store closures, daily weights and store closure adjustment factors is saved within a data store, such as the Teradata data warehouse, distributed by NCR Corporation of Dayton, Ohio. Historical weekly sales information, store location information, product information and daily product demand data is stored in the database tables labeled YearWeek 901, Location 903, M_Location_Rel 905, Product 907 and Daily_Prod_Dmnd 909. A store holiday closure calendar and fiscal calendar are saved in database tables HolidayClosureCalendar 911 and FiscalCalendar 913, respectively.

Prior week daily demand values are saved in a database table DWDailyC1Dmnd 915, and prior calculated daily weights and holiday coefficients are saved in a database table DWDailyweights 919. Run-time options, such as adaptive factors, are stored in a database table Parameter 917. Default weight values are saved to database table DayWeekWeight 921.

Weights can be calculated at a national, regional, district or store location level. Store location information, product information and current week daily product demand data is extracted from database tables 901, 903, 905, 907 and 909 and accumulated at the Nation-Region-District-Location (NRDL) level selected by the retailer as shown in step 923. The user can set any of the following levels for the daily weight calculation: Nation, Region, District, or Store/Distribution Center/Profile Store Group. The accumulated current week demand data is stored in a temporary table DWDailyC1Dmnd_Temp 925.

The holiday closure calendar and fiscal calendar, saved in database tables 911 and 913, respectively, are consulted to determine whether the current week includes a store closure as shown in step 927. For non-holiday weeks, new regular week daily weights are calculated from the data stored in temporary table DWDailyC1Dmnd_Temp 925 as shown in step 929. The calculated current week daily weights, run time option data from Parameter table 917, prior calculated daily weights from DWDailyweights table 919, and default weight values from DayWeekWeight table 921 are combined as shown in step 931. New regular week daily weights are blended with prior daily weights from table 919 using the response factor from table 917. In the absence of prior daily weight values, the new regular week daily weights are blended with default daily weights from table 921 using the response factor from table 917.

For holiday or store closure weeks, new holiday coefficients are calculated as shown in step 929. The calculated current holiday coefficients, run time option data from Parameter table 917, prior calculated holiday coefficients from DWDailyweights table 919, and default weight values from DayWeekWeight table 921 are combined as shown in step 935. New regular week daily weights are blended with prior daily weights from table 919 using the response factor from table 917. In the absence of prior holiday coefficient values, the holiday coefficients are blended with default values from table 921 using the response factor from table 917.

Regular week daily weights are combined with holiday coefficients in step 937 to generate a new table of daily weights, DWDailyweights_new 939. This new table is merged with the old table DWDailyweights 919, and table DWDailyC1Dmnd 915 is replaced with a new table as shown in step 941.

Figure 10A:
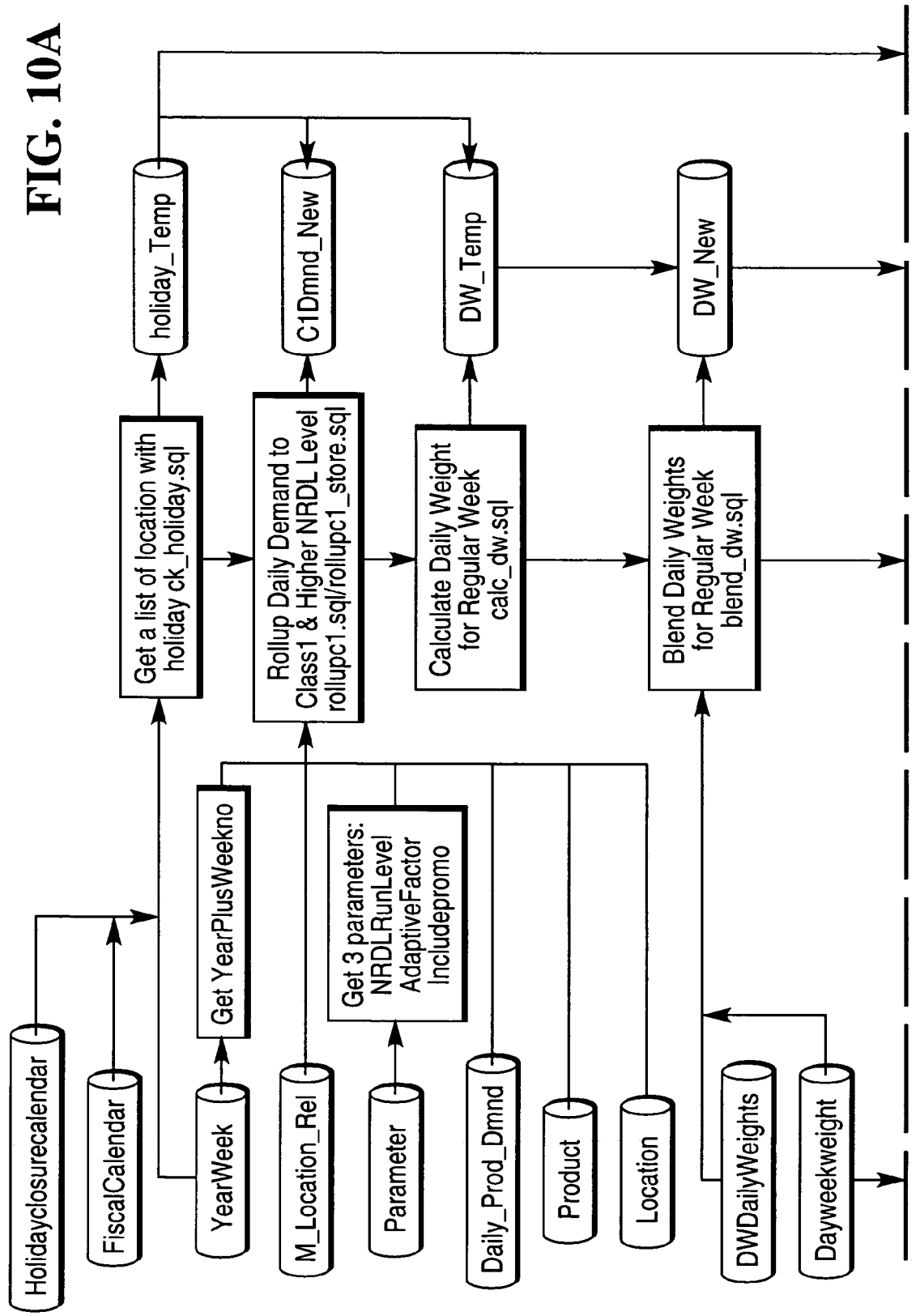
FIGS. 10A through 10C, taken together, provide a more detailed data flow diagram for a system for calculating daily weights and forecasts.
Figure 10B:
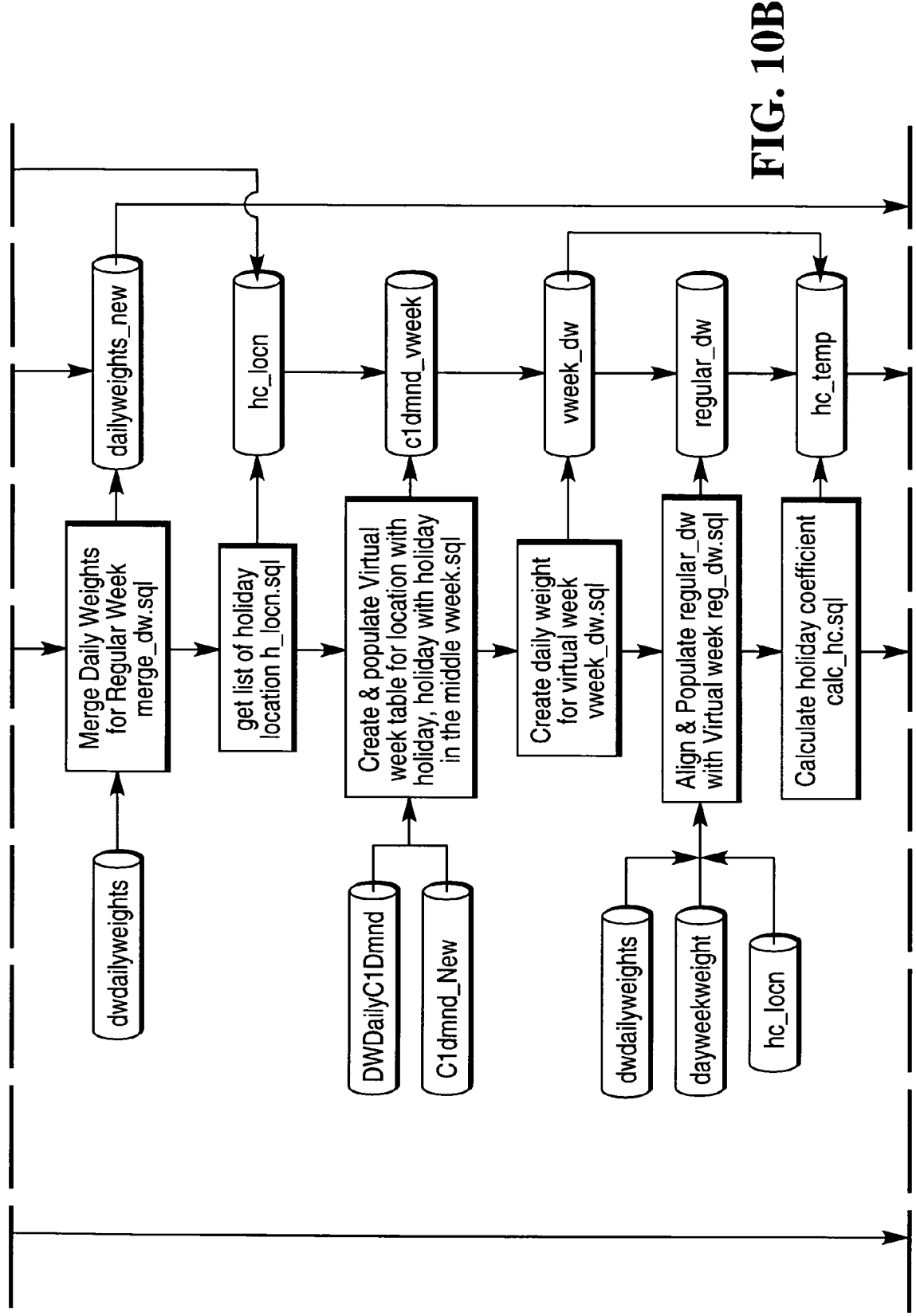
Figures 10, 10C:
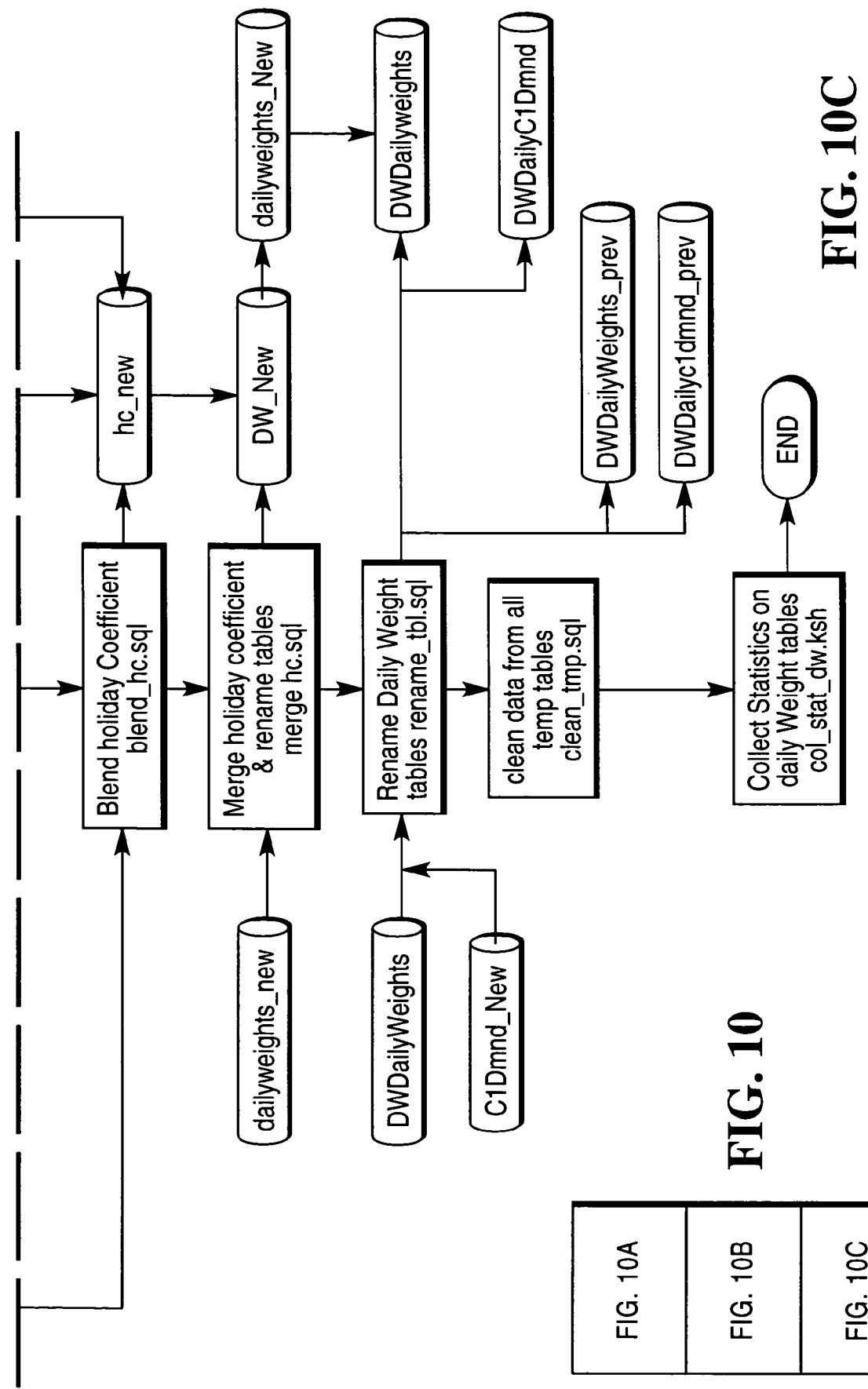
Figure 11A:
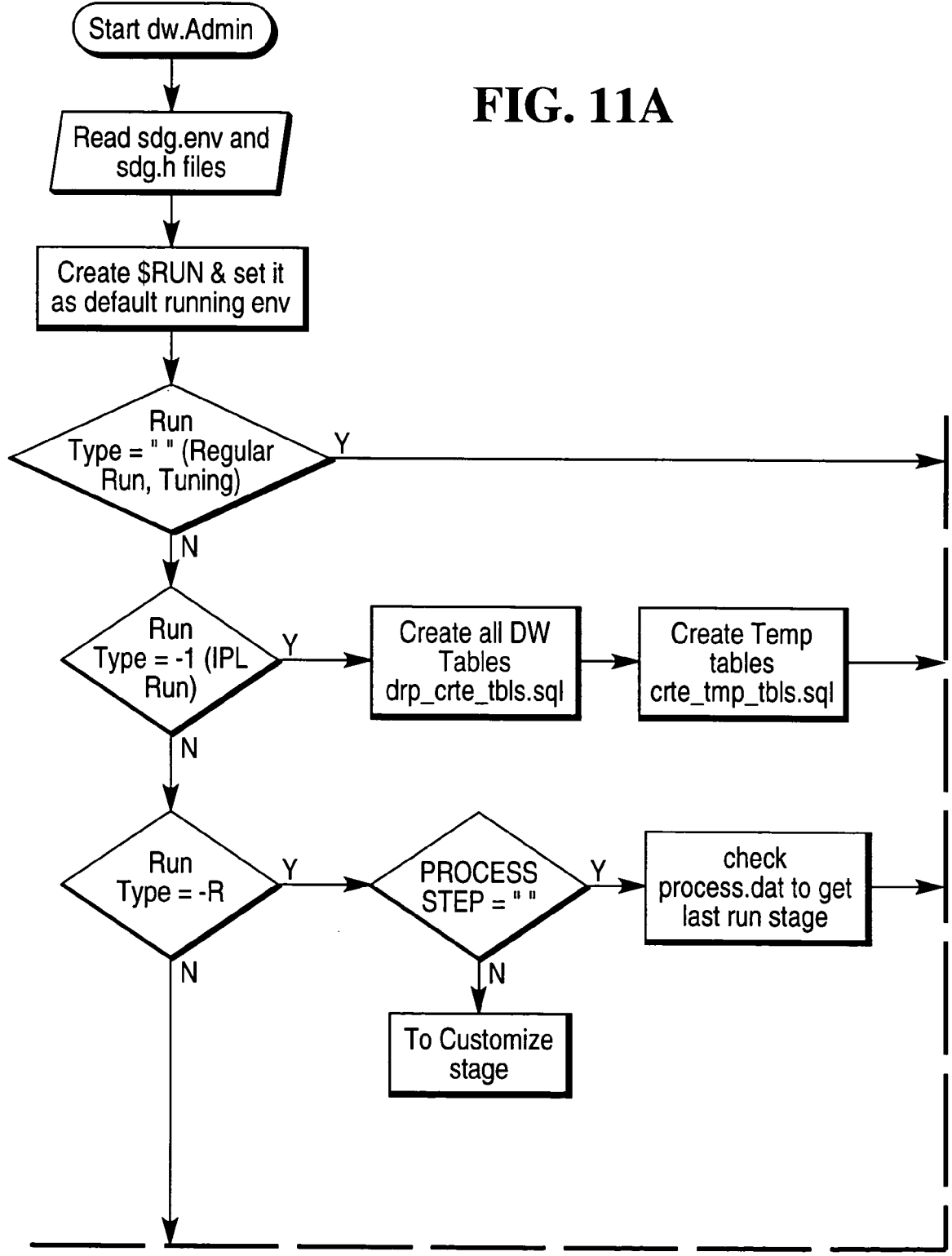
Figure 11C:
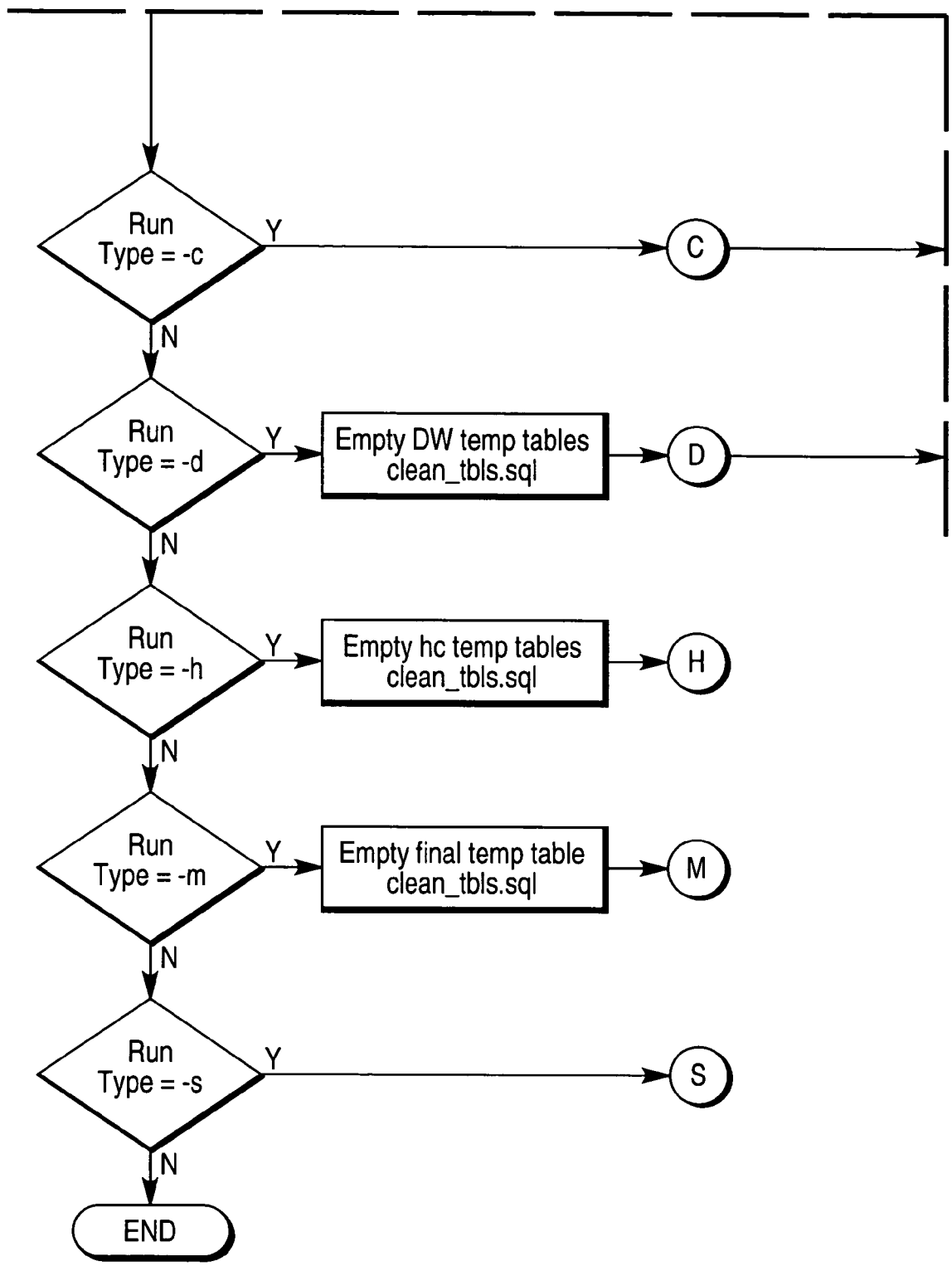
Figure 11D:
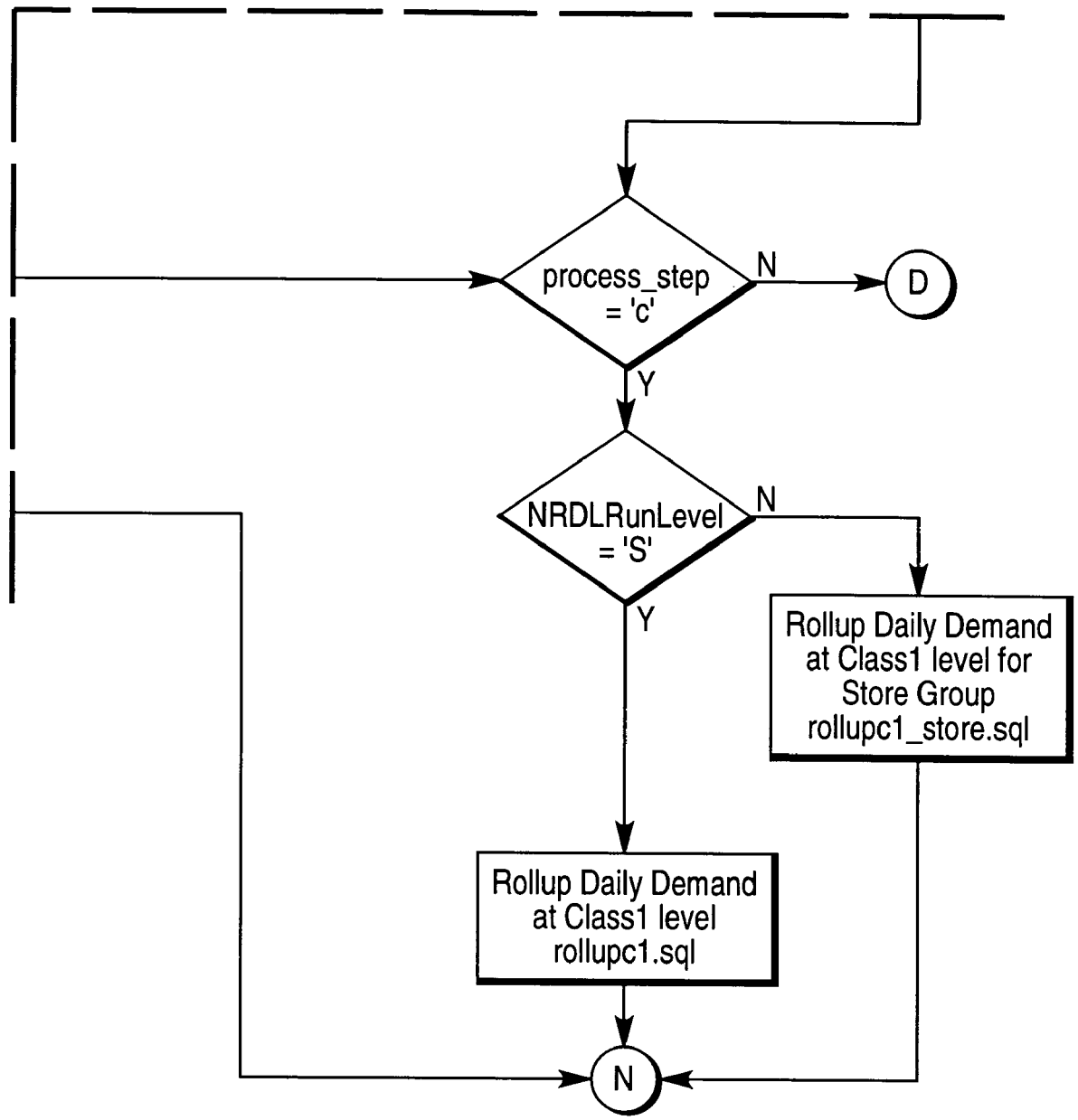
Figure 12B:
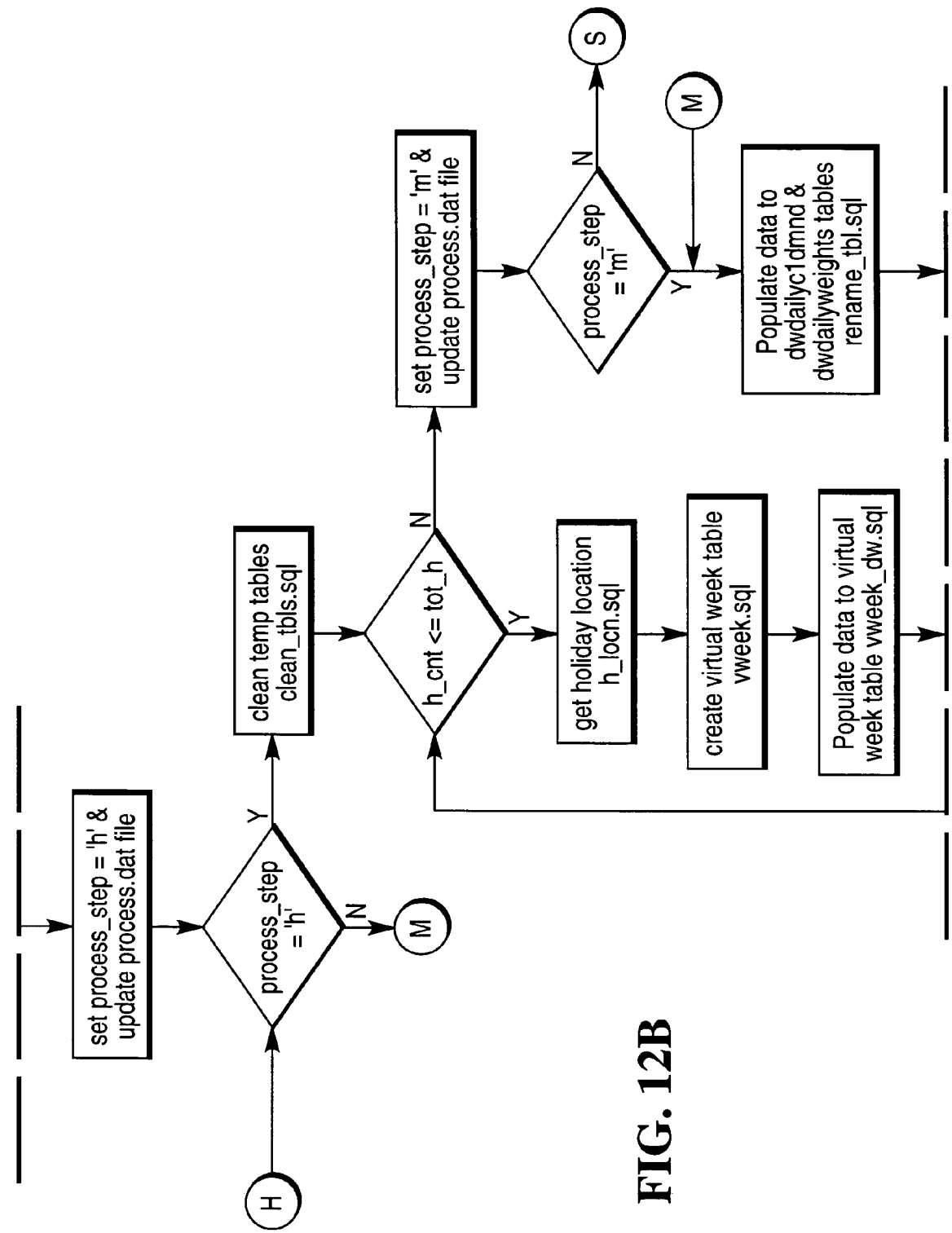
Figure 12C:
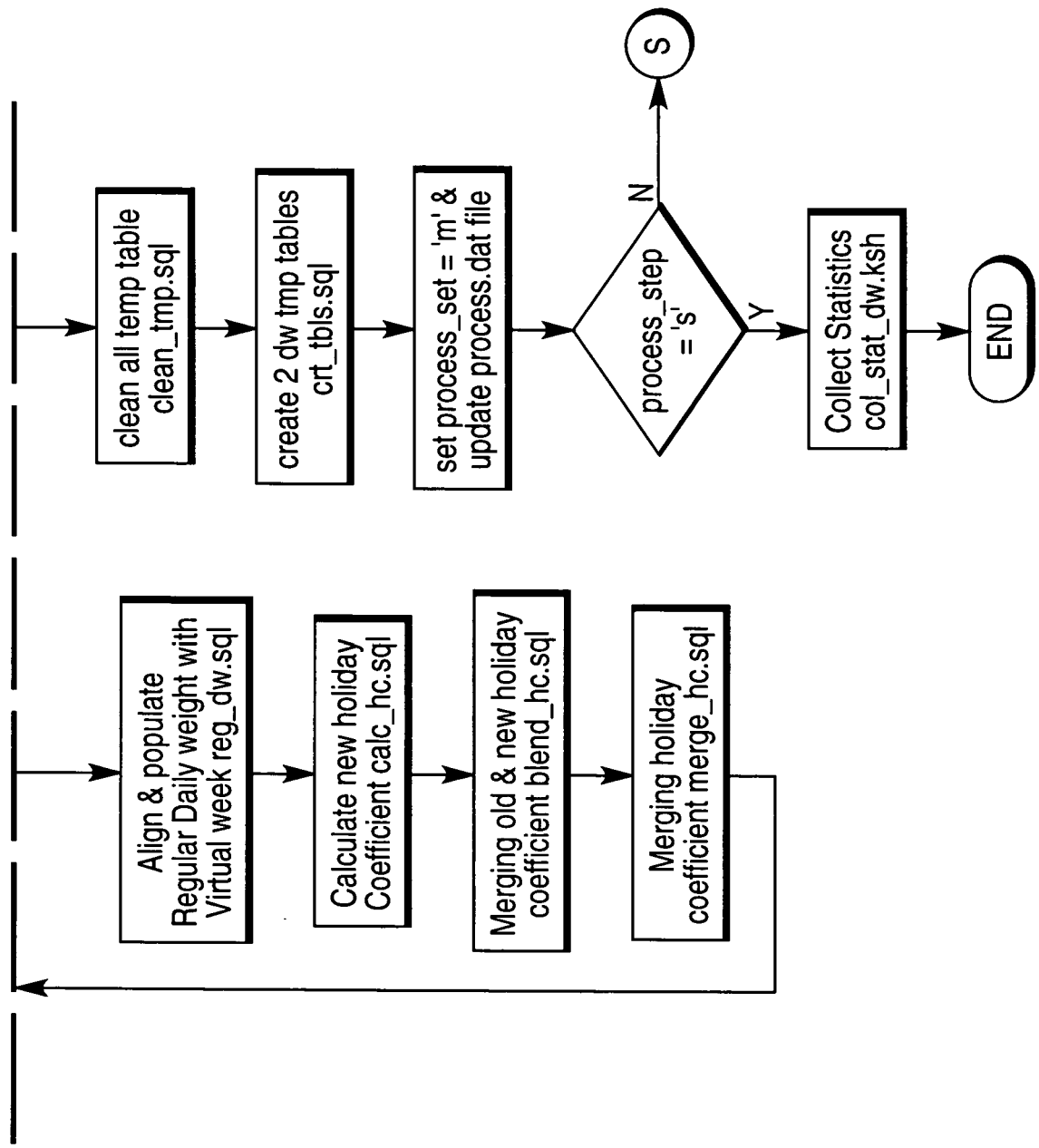

The process shown in FIGS. 8 and 9 and described above, is shown in greater detail in the data flow diagram of FIGS. 10A through 10C and the process flow diagram illustrated in FIGS. 11A through 11D and 12A through 12C.

CONCLUSION

The improved demand chain forecasting tool described above uses historical demand, seasonal patterns, weekly patterns, and the effect of holidays and store closures to determine at any level of a retail store or merchandise hierarchy the percentage of weekly sales forecast that can be attributed to each day of the week. Through accurate daily forecasting, a retailer is able to minimize store inventories and optimize store replenishment schedules. Additionally, such forecasting tool may assist a retailer in implementing sales promotions that are less than a week in duration.

The foregoing description of various embodiments of the invention has been presented for purposes of illustration and description. It is not intended to be exhaustive nor to limit the invention to the precise form disclosed. Many alternatives, modifications, and variations will be apparent to those skilled in the art in light of the above teaching. For example, the improved demand chain forecasting tool described herein is not limited to any particular retail business, and may be used to forecast daily sales for a particular store, sales region, store department, class of merchandise, or product. A business need not implement all the features included in the system described herein. For example, a convenience store that is open seven days a week throughout the year, will not need to calculate store closure coefficients or alter daily forecasts for weeks including store closures. Accordingly, this invention is intended to embrace all alternatives, modifications, equivalents, and variations that fall within the spirit and broad scope of the attached claims.

What is claimed is:

1. A computer-implemented method to determine daily demand forecasts for a product, comprising the steps of:

maintaining an electronic database of historical demand data said product, wherein said historical demand data includes historical daily demand data for said product for a period of at least one regular week, and historical daily demand data for said product for a period of at least one week that includes a store closure day;

electronically calculating a daily weight value for said product for each day of said regular week from said historical daily demand data, each daily weight value representing the ratio of the historical daily demand for a corresponding day of said regular week to a total of said historical daily demands for said week;

electronically determining a daily demand forecast for each day of a forthcoming week from said daily weight values and a weekly demand forecast for said forthcoming week;

electronically calculating a store closure coefficient for said product for each store closure impacted day of said week that includes a store closure day, each store closure coefficient representing the ratio of the historical daily demand for a corresponding store closure impacted day to the historical demand for a corresponding day during said regular week; and using a computer for modifying said daily demand forecast for each day of a forthcoming week including a store closure day through application of said store closure coefficients to the prior determined daily demand forecasts.

2. The method in accordance with claim 1, further comprising the steps of:

establishing default store closure coefficients; and modifying said daily demand forecast for each day of a forthcoming week including a store closure through application of said default store closure coefficients to the prior determined daily demand forecasts in the absence of historical daily demand data for said product for a period of at least one week that includes a store closure day.

3. The method in accordance with claim 1, wherein:

said store closure impacted days comprise the two weekdays prior to said store closure day and the one weekday following said store closure day.

4. A computer-implemented method to determine daily demand forecasts for a product, comprising the steps of:

storing within a computer storage device historical daily demand data for said product for a period of at least one regular week;

storing within a computer storage device historical daily demand data for said product for a period of at least one week that includes a store closure day;

using a computer for electronically calculating a daily weight value for said product for each day of said regular week from said historical daily demand data, each daily weight value representing the ratio of the historical daily demand for a corresponding day of said regular week to a total of said historical daily demands for said week;

electronically calculating a store closure coefficient for said product for each store closure impacted day of said week that includes a store closure day from said historical daily demand data, each store closure coefficient representing the ratio of the historical daily demand for a corresponding store closure impacted day to the historical demand for a corresponding day during said regular week;

modifying said daily weight values through application of said store closure coefficients to the prior determined daily weight values; and electronically determining a daily demand forecast for each day of a forthcoming week including a store closure from said modified daily weight values and a weekly demand forecast for said forthcoming week.

5. The method in accordance with claim 4, wherein:

said store closure impacted days comprise the two weekdays prior to said store closure day and the one weekday following said store closure day.

6. A computer-implemented product daily demand forecasting system, comprising:

a processor;

an electronic data store including historical daily demand data for said product for a period of at least one regular week and historical daily demand data for said product for a period of at least one week that includes a store closure day; and a computer program storage device embodying a daily demand forecasting application executable by said processor, said daily demand forecasting application receives historical daily demand data from said data store, calculates a daily weight value for said product for each day of said regular week, each said daily weight value representing the ratio of the historical daily demand for a corresponding day of said regular week to a total of said historical daily demands for said week, and determines a daily demand forecast for each day of a forthcoming week from said daily weight values and a weekly demand forecast for said forthcoming week; and said daily demand forecasting application receives historical daily demand data for said product for a period of at least one week that includes a store closure day from said data store, calculates a store closure coefficient for said product for each store closure impacted day of said week that includes a store closure day, each store closure coefficient representing the ratio of the historical daily demand for a corresponding store closure impacted day to the historical demand for a corresponding day during said regular week, and modifies said daily demand forecast for each day of a forthcoming week including a store closure day through application of said store closure coefficients to the prior determined daily demand forecasts.

7. The product daily demand forecasting system according to claim 6, wherein:

said store closure impacted days comprise the two weekdays prior to said store closure day and the one weekday following said store closure day.

* * * * *